(12) United States Patent
Lin

(10) Patent No.: US 7,223,823 B2
(45) Date of Patent: May 29, 2007

(54) CATALYST SYSTEM AND PROCESS

(75) Inventor: Zerong Lin, Kingwood, TX (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 43 days.

(21) Appl. No.: 10/866,912

(22) Filed: Jun. 14, 2004

(65) Prior Publication Data

US 2004/0242811 A1 Dec. 2, 2004

Related U.S. Application Data

(63) Continuation of application No. 10/456,604, filed on Jun. 6, 2003.

(60) Provisional application No. 60/387,006, filed on Jun. 6, 2002.

(51) Int. Cl.
*C08F 4/24* (2006.01)
*C08F 110/02* (2006.01)
*C08F 210/02* (2006.01)

(52) U.S. Cl. .................. 526/106; 526/129; 526/348.2; 526/352

(58) Field of Classification Search ............... 526/105, 526/106, 116, 129, 348, 348.2, 352
See application file for complete search history.

(56) References Cited

U.S. PATENT DOCUMENTS

| | | | |
|---|---|---|---|
| 2,825,721 A | 3/1958 | Hogan | 260/88.1 |
| 3,887,494 A | 6/1975 | Dietz | 252/452 |
| 4,182,810 A | 1/1980 | Willcox | |
| 4,402,864 A * | 9/1983 | McDaniel | 502/171 |
| 4,877,763 A | 10/1989 | McDaniel et al. | 502/117 |
| 5,096,868 A | 3/1992 | Hsieh et al. | 502/107 |
| 5,274,056 A * | 12/1993 | McDaniel et al. | 526/106 |
| 5,331,070 A * | 7/1994 | Pettijohn et al. | 526/105 |
| 6,013,595 A | 1/2000 | Lhost et al. | 502/113 |
| 6,174,981 B1 | 1/2001 | Coutant et al. | 526/348.2 |
| 6,194,520 B1 | 2/2001 | Cheruvu et al. | |
| 6,200,920 B1 * | 3/2001 | Debras et al. | 502/103 |
| 6,201,077 B1 | 3/2001 | Bergmeister et al. | |
| 6,242,543 B1 | 6/2001 | Follestad et al. | 526/118 |
| 6,316,553 B1 | 11/2001 | McDaniel et al. | 526/64 |
| 6,399,722 B1 | 6/2002 | Szul et al. | 526/113 |
| 6,489,428 B1 | 12/2002 | Debras et al. | 526/352 |
| 6,524,988 B2 | 2/2003 | Speca | 502/152 |
| 6,538,077 B1 * | 3/2003 | Shveima et al. | 526/106 |
| 6,586,544 B2 | 7/2003 | Szul et al. | 526/160 |
| 6,642,324 B2 | 11/2003 | Bergmeister et al. | 526/129 |
| 6,646,069 B2 * | 11/2003 | Monoi et al. | 526/105 |
| 6,657,024 B1 | 12/2003 | Blackmon et al. | 526/128 |
| 6,734,131 B2 | 5/2004 | Shih et al. | 502/80 |
| 6,809,057 B2 | 10/2004 | Lin et al. | 502/152 |
| 6,825,292 B2 | 11/2004 | Reid | 526/89 |
| 6,831,143 B2 | 12/2004 | Britovsek et al. | 526/352 |
| 6,833,416 B2 | 12/2004 | Kinnan et al. | 526/82 |
| 6,846,770 B2 | 1/2005 | Speca | 502/104 |
| 6,846,886 B2 | 1/2005 | Mawson et al. | 526/115 |
| 2003/0232715 A1 | 12/2003 | Katzen et al. | 502/107 |
| 2003/0232935 A1 | 12/2003 | Kendrick et al. | 526/60 |
| 2004/0242808 A1 | 12/2004 | Mink et al. | 526/59 |

FOREIGN PATENT DOCUMENTS

| | | |
|---|---|---|
| CA | 969525 | 6/1975 |
| DE | 19 50 940 | 4/1970 |
| DE | 26 22 755 A1 | 12/1977 |
| EP | 0 279 890 A2 | 8/1988 |
| EP | 1 172 381 A1 | 1/2002 |
| GB | 1271445 | 4/1972 |
| GB | 1405255 | 10/1975 |
| GB | 1433052 | 4/1976 |
| GB | 2073761 | 10/1981 |
| JP | 49-34759 | 9/1974 |
| JP | 49034759 * | 9/1974 |
| JP | 1996245714 A | 9/1996 |
| WO | WO 94/21962 | 9/1994 |
| WO | WO 01/32307 A1 | 5/2001 |
| WO | WO 03/104291 | 12/2003 |

OTHER PUBLICATIONS

Marsden, C.E., "Plastics, Rubber and Composites Processing and Applications, "vol.21, pp.193-200, 1994.

* cited by examiner

*Primary Examiner*—Caixia Lu
(74) *Attorney, Agent, or Firm*—Catherine L. Bell

(57) ABSTRACT

This invention relates to a process of polymerizing ethylene in a reactor comprising contacting a catalyst system comprising a supported chromium catalyst and an aluminum alkyl cocatalyst, where the catalyst and cocatalyst are contacted by cofeeding the catalyst and cocatalyst to the reactor or feeding the catalyst and cocatalyst separately to the reactor, where the catalyst and cocatalyst are not contacted prior to the step of feeding or cofeeding, with ethylene, and from 0 to 50 mole % of one or more comonomers, where the polymerization occurs at a temperature between 50 and 120° C., and the molar ratio of aluminum from the cocatalyst to the chromium in the supported chromium catalyst is 30:1 or more.

32 Claims, No Drawings

CATALYST SYSTEM AND PROCESS

PRIORITY CLAIM & CROSS-REFERENCE TO RELATED APPLICATIONS

This Application is a continuation in part of U.S. Ser. No. 10/456,604, filed Jun. 6, 2003, which claims the benefit of U.S. Provisional Application No. 60/387,006, filed Jun. 6, 2002, the disclosures of which are incorporated herein by reference in its entirety.

FIELD OF THE INVENTION

The invention is generally directed to methods to produce bimodal polymers using supported chromium catalyst systems.

BACKGROUND

Chromium catalysts, sometimes termed Phillips catalysts, are well known catalysts for olefin polymerization. In these catalysts, a chromium compound, such as chromium oxide, is supported on a support of one or more inorganic oxides such as silica, alumina, zirconia or thoria, and activated by heating in a non-reducing atmosphere. U.S. Pat. No. 2,825,721 describes chromium catalysts and methods of making the catalysts. It is also known to increase polymer melt index by using a silica-titania support as disclosed, for example, in U.S. Pat. No. 3,887,494.

European patent application EP 1 172 381 A1 (equivalent to U.S. Pat. No. 6,646,069) discloses a method for producing ethylene polymers reputedly having improved environmental stress crack resistance (ESCR) using a trialkylaluminum compound-carried chromium catalyst. The activated chromium compound on an inorganic support is treated with a trialkylaluminum compound in an inert hydrocarbon solvent and the solvent removed to form a trialkylaluminum-carried chromium catalyst. EP 1 172 381 A1 discloses that the time of contact with the solvent must be minimized to avoid over-reduction and associated degradation of polymer properties. The reference further teaches that for ESCR and impact resistance it is essential to use hydrogen in a carefully controlled hydrogen-ethylene ratio. The need for careful control of contact time, hydrogen concentration, and amount of trialkylaluminum used in the catalyst synthesis in order to achieve desired polymer properties limits the usefulness of such methods. Likewise the molar ratio of the trialkyl aluminum compound to the chromium atom is 0.5 to 10.

U.S. Pat. No. 6,174,981 discloses a process of polymerizing ethylene and at least one C3 to C8 mono-olefin in the presence of a catalyst including chromium supported on a silica-titania support and a trialkylboron compound. The process, however, produces resins that generally have density and HLMI (high load melt index, I21.6) values lower than would be desirable for environmentally demanding applications such as for pipe or drum resins.

Other relevant references include EP 0 279 890; WO 01/32307; DE 2,622,755; U.S. Pat. No. 5,096,868; U.S. Pat. No. 4,877,763; GB 1,271,445; CA 969,525; GB 1,405,255; GB 1,433,052; GB 2,073,761; and U.S. Pat. No. 6,242,543.

SUMMARY OF THE INVENTION

This invention relates to a process of polymerizing ethylene in a reactor comprising contacting a catalyst system comprising a supported chromium catalyst and a cocatalyst selected from aluminum alkyls, and mixtures thereof (where the catalyst and cocatalyst are contacted by cofeeding the catalyst and cocatalyst to the reactor or feeding the catalyst and cocatalyst separately to the reactor, where the catalyst and cocatalyst are not contacted prior to the step of feeding or cofeeding); and ethylene, and from 0 to 30 mole % of one or more comonomers, where the polymerization occurs at a temperature between 50 and 120° C., and the molar ratio of aluminum from the cocatalyst to the chromium in the supported chromium catalyst is 30:1 or more.

In other embodiments, the invention provides polyethylene resins produced by the inventive processes, and articles formed from or including the polyethylene resins. Typical articles include, for example, containers for household industrial chemicals, drainage, pressure and conduit pipe, industrial bulk containers such as drums (typically 30 or 50 gallon drums), and geomembranes.

DETAILED DESCRIPTION

Catalyst System

The catalyst system includes a supported chromium catalyst and a cocatalyst. Supported chromium catalysts are well known, and are described, for example, in U.S. Pat. No. 2,825,721. In general, such catalysts include a chromium compound supported on an inorganic oxide matrix. Typical supports include silicon, aluminum, zirconium and thorium oxides, as well as combinations thereof. Various grades of silica and alumina support materials are widely available from numerous commercial sources.

In a particular embodiment, the support is silica. A suitable silica is a high surface area, amorphous silica, such as a material marketed under the tradenames of Davison 952 or Davison 955 by the Davison Chemical Division of W.R. Grace and Company. These silicas are in the form of spherical particles obtained by a spray-drying process, and have a surface area of about 300 m2/g, and a pore volume of about 1.65 cm3/g. Granular silica can also be used.

In another embodiment, the support is a silica-titania support. Silica-titania supports are well known in the art and are described, for example, in U.S. Pat. No. 3,887,494. Silica-titania supports can be produced as described in U.S. Pat. Nos. 3,887,494, 5,096,868 or 6,174,981 by "cogelling" or coprecipitating silica and a titanium compound. Such a cogel can be produced by contacting an alkali metal silicate such as sodium silicate with an acid such as sulfuric acid, hydrochloric acid or acetic acid, or an acidic salt. The titanium component can be conveniently dissolved in the acid or alkali metal silicate solution and co-precipitated with the silica. The titanium compound can be incorporated in the acid in any form in which it subsequently will be incorporated in the silica gel formed on combination of the silicate and the acid and from which form it is subsequently convertible to titanium oxide on calcination. Suitable titanium compounds include, but are not limited to, halides such as TiCl3 and TiCl4, nitrates, sulfates, oxalates and alkyl titanates. In instances where carbon dioxide is used as the acid, the titanium can be incorporated into the alkali metal silicate itself. When using acidic salts, the titanium compound can be incorporated in the alkali metal silicate and in such instances, convenient titanium compounds are water soluble materials which do not precipitate the silicate, i.e., are those convertible to titanium oxide on calcination such as, for example, various titanium oxalates, such as $K_2TiO(C_2O_4)_2 \cdot H_2O$, $(NH_4)_2TiO(C_2O_4)_2 \cdot H_2O$ and $Ti_2(C_2O_4)_3 \cdot H_2O$. As used herein, the term "silica-titania" support includes supports formed by any of these coprecipitation or cogel processes, or other processes by which titania and silica are both incorporated into the support.

In another embodiment, titanium is incorporated by surface-modifying a supported chromium catalyst. As used herein, the term "titanium surface-modified supported chromium catalyst" is meant to include any supported chromium catalyst that is further modified to include titanium; see, e.g., C. E. Marsden, *Plastics, Rubber and Composites Processing and Applications,* 21 (1994), 193–200. For example, it is known to modify supported chromium catalysts by slurrying the chromium catalyst in a hydrocarbon and contacting the slurry with a titanium alkoxide, $Ti(OR)_4$, and heating to form a dried, titanium surface-modified supported chromium catalyst. The alkyl group R of the alkoxide can be a $C_3$ to $C_8$ linear or branched alkyl group; a particular example of a suitable titanium alkoxide is titanium tetraisopropoxide. Another method of titanating a supported chromium catalyst is to heat a solid supported chromium catalyst and a solid titanium compound such as titanium tetraacetoacetate under gas fluidization conditions, whereby the titanium compound sublimes and titanium is deposited on the supported chromium catalyst, possibly as a titanium oxide.

The titanium compound preferably is generally present in an amount of from a lower limit of 0.5% or 1% or 2% or 3% or 5% titanium by weight to an upper limit of 12% or 10% or 8% or 6% by weight, with ranges from any lower limit to any upper limit being contemplated.

The chromium compound can be incorporated in any convenient method known in the art. For example, the chromium compound, is dissolved in an acidic material or the silicate and thus coprecipitated with the silica. A suitable chromium compound for this method is chromic sulfate. Another method to incorporate a chromium compound into a support is to use a hydrocarbon solution of a chromium compound convertible to chromium oxide to impregnate the support after it is spray dried or azeotrope dried (i.e., a xerogel). Exemplary of such materials are t-butyl chromate, chromium acetylacetonate, and the like. Suitable solvents include, but are not limited to, pentane, hexane, benzene, and the like. Alternatively, an aqueous solution of a chromium compound simply can be physically mixed with the support. These types of catalyst systems are disclosed in U.S. Pat. No. 3,887,494.

Chromium is typically present in the support in an amount from a lower limit of 0.1 or 0.5 or 0.8 or 1.0% or 1.5% by weight to an upper limit of 10% or 8% or 5% or 3% % by weight, with ranges from any lower limit to any upper limit being contemplated.

Supported chromium catalysts are commercially available. Suitable commercially available chromium catalysts include HA30W and HA30LF, products of W.R. Grace & Co., containing about 1% Cr by weight.

Supported titanium-chromium catalysts are also commercially available. Suitable commercially available titanium-chromium catalysts include titanium-surface modified chromium catalysts from PQ Corporation such as C-23307, C-25305, C-25345, C-23305, and C-25307. Commercially available titanium-surface modified chromium catalysts typically contain about 1–5% Ti and 1% Cr by weight.

In any of the supports described above, the support can also include other inorganic oxides, such as alumina, thoria or zirconia. Further, the support can be treated by various methods known in the art, such as by fluoridation.

The catalyst is activated prior to use by heating the dry catalyst system in a non-reducing atmosphere, conveniently in air or in an oxygen-enriched atmosphere. The calcination temperature can be from 400 or 450 or 500 or 550° C. to 900 or 800 or 700° C., with ranges from any lower limit to any upper limit being contemplated. In a particular embodiment, the calcination temperature is greater than 500° C., preferably greater than 600° C. Typical heating times can be for 30 minutes to 50 hours, with 2 to 20 hours being generally sufficient. Without wishing to be bound by theory, it is generally believed that the calcination procedure results in at least a substantial portion of the chromium being oxidized to a hexavalent form. Calcination is conveniently carried out in a stream of fluidizing air wherein the stream of fluidizing air is continued as the material is cooled. As a specific example, the catalyst can be placed in a cylindrical tube and fluidized in dry air at about 2 feet per minute linear velocity while being heated to a pre-determined temperature, typically 400 to 900° C., and held at temperature for about 6 hr. The activated catalyst is recovered as a free-flowing powder. Catalysts can also be activated with a sequence of gaseous compositions. For example, the catalyst can be first heated in nitrogen to a first temperature, followed by air at a second temperature, then cooled under nitrogen to ambient temperature. Activation can also involve a short period using carbon monoxide as the fluidization gas between the air and/or nitrogen steps. At the end of activation the catalyst is cooled to ambient temperature and stored under nitrogen for use in the polymerization reactor.

The catalyst is used in conjunction with a cocatalyst, as described below. In general, the cocatalyst can be an aluminum alkyl. The cocatalyst can be a compound of formula $AlR_3$, where Al is a aluminum, and each R is independently a linear or branched $C_1$ or $C_2$ or $C_4$ to $C_{12}$ or $C_{10}$ or $C_8$ alkyl group. Preferably R is a $C_1$ to $C_{20}$ alkyl, preferably a $C_2$ to $C_{12}$ alkyl, more preferably a $C_2$ to $C_8$ alkyl. Preferably the cocatalyst is selected from the group consisting of: triethyl aluminum, tri-isobutyl aluminum, trimethyl aluminum, trin-octyl aluminum, tri-n-hexyl aluminum, tri-n-butyl aluminum. Mixtures of two or more such aluminum alkyls are also contemplated, and are included within the term "cocatalyst" as used herein.

The concentration of cocatalyst in the reaction diluent is from 0.1 or 1 or 5 or 10 or 20 or 30 or 40 ppm to 100 or 90 or 80 or 70 or 60 ppm, wit ranges from any lower limit to any upper limit being contemplated. The concentration of cocatalyst is expressed as parts by weight of cocatalyst per million parts by weight of the diluent phase.

In a preferred embodiment, the ratio of moles of cocatalyst to moles of chromium is greater than 30:1, preferably greater than 40:1, preferably greater than 50:1, preferably greater than 60:1, preferably greater than 70:1, preferably greater than 80:1, preferably greater than 90:1, preferably greater than 100:1, preferably greater than 110:1, preferably greater than 120:1, preferably greater than 130:1, preferably greater than 140:1, preferably greater than 150:1, preferably greater than 160:1, preferably greater than 170:1, preferably greater than 180:1, preferably greater than 190:1, preferably greater than 200:1, preferably greater than 210:1, preferably greater than 220:1, preferably greater than 230:1, preferably greater than 240:1, preferably greater than 250:1, preferably greater than 260:1, preferably greater than 270:1, preferably greater than 280:1, preferably greater than 290:1, preferably greater than 300:1, preferably greater than 350:1, preferably greater than 400:1, preferably greater than 500:1.

More or less cocatalyst can be used, depending upon the amount of poisons present in the reaction system. Poisons in the reactor that can consume or deactivate the cocatalyst include, for example, as oxygen, water, carbon monoxide or carbon dioxide.

In one embodiment, the catalyst system is formed in a polymerization reactor, by providing a supported chromium catalyst and a trialkylaluminum cocatalyst as described above; and contacting the catalyst and cocatalyst to form a catalyst system. The catalyst and cocatalyst can be contacted by cofeeding the catalyst and cocatalyst to the reactor, or feeding the catalyst and cocatalyst separately to the reactor. The catalyst and cocatalyst are not contacted prior to the step of feeding or cofeeding.

In another embodiment, the catalyst system is formed in a polymerization reactor, by providing a supported chromium catalyst activated at a temperature of greater than 500° C., preferably greater than 600° C., and an aluminum alkyl cocatalyst as described above; and contacting the catalyst and cocatalyst to form a catalyst system. The catalyst and cocatalyst can be contacted by cofeeding the catalyst and cocatalyst to the reactor, or feeding the catalyst and cocatalyst separately to the reactor. The catalyst and cocatalyst are not contacted prior to the step of feeding or cofeeding.

Polymerization Process

The methods of the invention can generally be carried out in a slurry reactor, such as a stirred slurry reactor or a slurry loop reactor, or in a gas phase reactor. For illustrative purposes, the methods are described below with particular reference to a slurry loop reactor. However, it should be appreciated that the methods are not limited to this particular reactor configuration.

A slurry loop olefin polymerization reactor can generally be described as a loop-shaped continuous tube. In some instances, the reactor design may be generally "O" shaped. One or more fluid circulating devices, such as an axial pump, urge the reactor constituents within the tube in a desired direction so as to create a circulating current or flow of the reactor constituents within the tube. Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

In the slurry loop olefin polymerization reactor, the polymerization medium includes monomer, optional comonomer, and a hydrocarbon solvent or diluent, advantageously aliphatic paraffin such as propane, isobutane, hexane, heptane, or cyclohexane, for example, or an aromatic diluent such as toluene, or mixtures thereof. The polymerization is carried out at a temperature of from a lower limit of 50 or 60 or 70 or 80° C. to an upper limit of 120 or 110 or 100 or 90° C., with ranges from any lower limit to any upper limit being contemplated. In a particular embodiment, the polymerization is carried out at a temperature of greater than 80° C. or greater than 85° C. Any pressure may be used, however preferred pressures can vary from about 100 to about 700 psia (0.69–4.8 MPa). Additional description of preferred processes is given in U.S. Pat. Nos. 5,274,056 and 4,182,810 and PCT publication WO 94/21962. As such, the reactor constituents generally are a combination of both solids, such as supported catalyst and polymerized olefin, and liquids, such as those described above. The percentage of solids within the reactor constituents may be as high as 60 wt % of the reactor constituents. Typically, the weight percent of solids is in the range of 45 to 55wt %.

The slurry loop olefin polymerization reactor may be operated in a single stage process or in multistage processes. In multistage processing, the polymerization of olefins is carried out in two or more reactors. These reactors can be configured in series, in parallel, or a combination thereof.

The methods of the invention are used in the slurry polymerization of ethylene to form polyethylene homopolymer or copolymer having the properties described herein. In some embodiments, the methods are carried out without addition of comonomer; i.e., the monomer feed is essentially ethylene, with no comonomer intentionally added, although it should be appreciated that minor amounts of other polymerizable olefins may be present in the ethylene feedstock, typically less than 1% or less than 0.5% or less than 0.1% or less than 0.05% or less than 0.01% by weight. Preferred polyethylenes formed in processes of the invention even without addition of comonomer can have short chain branching and other properties typically associated with polyethylene copolymers.

In some embodiments, both ethylene and at least one comonomer are provided to the reactor. Suitable comonomers include α-olefins, such as $C_3$–$C_{20}$ α-olefins or $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include conjugated and non-conjugated dienes, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the polyolefin and the specific comonomers selected. One skilled in the art can readily determine the appropriate comonomer content appropriate to produce a polyolefin having a desired density. As used herein, the term "comonomer" includes mixtures of two or more comonomers. Typically comonomers may be present at up to 50 mole %, preferably the comonomers are present from 0.5 to 30 mole %, more preferably from 1 to 25 mole %, more preferably from 2 to 20 mole %, more preferably from 3 to 15 mole %, more preferably from 4 to 10 mole %.

The catalyst and cocatalyst can be fed separately into the slurry reactor, such as through separate inlets or sequentially through a common inlet, or can be co-fed. As used herein, the term "co-fed" means that catalyst and cocatalyst feedstreams are combined and fed together into the reactor. This cofeeding or combining of feedstreams, is different from the pre-contacting required in the prior art, such as in EP 1 172 381, wherein a supported chromium catalyst is treated with trialkylaluminum cocatalyst and dried to produce a dry catalyst of fixed Al:Cr ratio, prior to introducing the catalyst to a polymerization reactor. Processes of the invention advantageously eliminate the need for such pre-contacting steps.

In one embodiment, the invention provides a process of polymerizing ethylene in a slurry reactor, by providing a supported chromium catalyst; providing a cocatalyst selected from metal alkyls of group 13 metals; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene to form polyethylene. The catalyst and cocatalyst are not contacted prior to the step of feeding or cofeeding, and the process is carried out without addition of alpha-olefin comonomer.

In another embodiment, the invention provides a process of polymerizing ethylene in a slurry reactor, by providing a supported chromium catalyst activated at a temperature of greater than 500° C., preferably greater than 600° C.; providing an aluminum alkyl cocatalyst, preferably a trialkyl aluminum; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene and alpha-olefin comonomer to form polyethylene. The catalyst and cocatalyst are not contacted prior to the step of feeding or cofeeding.

In another embodiment, the invention provides a process of polymerizing ethylene in a slurry reactor, by providing a supported chromium catalyst; providing an aluminum alkyl cocatalyst, preferably a trialkyl aluminum; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene and alpha-olefin comonomer to form polyethylene. The catalyst and cocatalyst are not contacted prior to the step of feeding or cofeeding, and the polymerization is carried out at a temperature greater than 80° C.

In another embodiment, the invention provides a process of polymerizing ethylene in a slurry reactor, by providing a supported chromium catalyst; providing a trialkylaluminum cocatalyst; contacting the catalyst and cocatalyst by cofeeding the catalyst and cocatalyst to the reactor or feeding the catalyst and cocatalyst separately to the reactor, to form a catalyst system; and contacting the catalyst system, under slurry polymerization conditions, with ethylene and alpha-olefin comonomer to form polyethylene. The catalyst and cocatalyst are not contacted prior to the step of feeding or cofeeding.

In some embodiments, ethylene is polymerized without intentional addition of comonomer.

In any of the embodiments described herein, hydrogen can be used if desired to control the molecular weight, as is well known in the art.

Product

The ethylene homopolymers and copolymers produced herein preferably have a broad molecular weight distribution (Mw/Mn), preferably greater than 25, preferably greater than 30, preferably greater than 35, preferably greater than 40, preferably greater than 45. Mw, Mn, and Mw/Mn are determined as described in the examples section. In another embodiment of this invention the polymer produced is bi- or multi-modal (on the SEC graph). By bi- or multi-modal is meant that the SEC graph of the polymer has two or more positive slopes, two or more negative slopes, and three or more inflection points (an inflection point is that point where the first derivative is zero and second derivative of the curve becomes negative or positive) OR the graph has at least has one positive slope, one negative slope, one inflection point and a change in the positive and or negative slope greater than 20% of the slope before the change. In another embodiment the SEC graph has one positive slope, one negative slope, one inflection point and an Mw/Mn of 10 or more, preferably 15 or more, preferably 20 or more. The SEC graph is generated by gel permeation chromatography on a waters 150° C. GPC instrument equipped with differential refraction index detectors. The columns are calibrated by running a series of narrow polystyrene standards and the molecular weights are calculated using Mark Houwink coefficients for the polymer in question.

EXAMPLES

Several commercially available supported chromium catalysts were used. HA30W is a product of W.R. Grace & Co. containing about 1% Cr by weight. 963 is a tergel catalyst of W.R. Grace & Co. C25345 is a aluminum and titanium-surface modified chromium catalyst available from PQ Corp.

Polymerizations

Polymerizations were conducted in an inert atmosphere ($N_2$) drybox using autoclaves equipped with an external heater for temperature control, glass inserts (internal volume of reactor=22.5 mL), septum inlets, regulated supply of nitrogen and ethylene, and equipped with disposable PEEK mechanical stirrers (800 RPM). The autoclaves were prepared by purging with dry nitrogen at 110° C. or 115° C. for 5 hours and then at 25° C. for 5 hours, and then purged with ethylene. Hexane, 1-hexene, and co-catalyst ($MgBu_2$, $ZnEt_2$, $BEt_3$ or $AlEt_3$) were added via syringe at room temperature and atmospheric pressure. The reactors were then brought to process temperature (85° C.) and charged with ethylene to process pressure (224 psig=1544 kPa) while stirring at 800 RPM. The catalyst slurry in toluene was added via syringe into the reactors at process conditions. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psig $O_2$/Ar (5 mole % $O_2$) gas mixture to the autoclaves for approximately 30 seconds. The polymerizations were quenched after a predetermined cumulative amount of ethylene had been added or for a maximum of 45 minutes polymerization time. The reactors were cooled and vented. The polymer was isolated after the volatiles were removed in-vacuo. Yields reported include total weight of polymer and residual catalyst/co-catalyst. Catalyst activity is reported as grams of polymer per gram of catalyst per hour of reaction time (g/g·hr).

Polymer Characterization

Polymer characterization results are given in Tables 1–5. For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 160° C. in a shaker oven for approximately 3 hours. The typical concentration of polymer in solution is between 0.4 to 0.9 mg/mL with a BHT concentration of 1.25 mg BHT/mL of TCB. Samples are cooled to 135° C. for testing.

Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples were run in TCB at (135° C. sample temperatures, 160° C. oven/columns) using three Polymer Laboratories: PLgel 10 µm Mixed-B 300×7.5 mm columns in series. No column spreading corrections were employed. Numerical analyses were performed using Epoch® software available from Symyx Technologies.

Samples for infrared analysis were prepared by depositing the stabilized polymer solution onto a silanized wafer (Part number S10860, Symyx). By this method, approximately between 0.12 and 0.24 mg of polymer is deposited on the wafer cell. The samples were subsequently analyzed on a Brucker Equinox 55 FTIR spectrometer equipped with Pikes's MappIR specular reflectance sample accessory. Spectra, covering a spectral range of 5000 $cm^{-1}$ to 500 $cm^{-1}$, were collected at a 2 $cm^{-1}$ resolution with 32 scans.

For ethylene-1-hexene copolymers, the wt. % copolymer is determined via measurement of the methyl deformation band at ~1378 $cm^{-1}$. The peak height of this band is normalized by the combination and overtone band at ~4321 $cm^{-1}$, which corrects for path length differences. The normalized peak height is correlated to individual calibration curves from $^1$H NMR data to predict the wt. % copolymer content within a concentration range of approximately 2.4 wt % to approximately 23.2 wt. % for hexene. Typically, $R^2$ correlations of 0.98 or greater are achieved. These numbers are given in Tables 1–5 under the heading, 1-Hexene.

TABLE 1

Ethylene 1-Hexene Copolymerization with HA30W Catalyst Activated at 593° C.

| Co-Catalyst Type/µmol | Activity g/g · hr | Mw (×10³) g/mole | Mw/Mn | 1-Hexene wt % |
|---|---|---|---|---|
| MgBu₂/1.0 | 333 | 641 | 30.9 | 3.2 |
| MgBu₂/2.8 | 546 | 614 | 26.4 | 3.0 |
| MgBu₂/4.6 | 523 | 533 | 28.5 | 2.9 |
| MgBu₂/6.4 | 750 | 464 | 32.2 | 2.5 |
| MgBu₂/8.2 | 545 | 450 | 24.0 | 2.6 |
| MgBu₂/10.0 | 609 | 525 | 24.6 | 2.7 |
| ZnEt₂/1.0 | 701 | 486 | 23.4 | 2.2 |
| ZnEt₂/2.8 | 696 | 456 | 22.0 | 2.0 |
| ZnEt₂/4.6 | 654 | 439 | 22.5 | 2.1 |
| ZnEt₂/6.4 | 683 | 412 | 20.4 | 2.3 |
| ZnEt₂/8.2 | 527 | 398 | 17.6 | 2.1 |
| ZnEt₂/10.0 | 508 | 399 | 17.0 | 2.1 |
| BEt₃/2.8 | 690 | 391 | 16.0 | 2.6 |
| BEt₃/4.6 | 392 | 356 | 13.5 | 2.6 |
| BEt₃/6.4 | 1529 | 385 | 35.6 | 2.3 |
| BEt₃/8.2 | 648 | 333 | 11.4 | 2.8 |
| BEt₃/10.0 | 450 | 377 | 12.1 | 2.8 |
| AlEt₃/1.0 | 906 | 539 | 23.6 | 2.2 |
| AlEt₃/2.8 | 1330 | 653 | 30.4 | 2.3 |
| AlEt₃/4.6 | 1437 | 838 | 36.4 | 2.0 |
| AlEt₃/6.4 | 1253 | 750 | 28.9 | 2.0 |
| AlEt₃/8.2 | 1241 | 985 | 42.2 | 2.3 |
| AlEt₃/10.0 | 1279 | 955 | 43.2 | 2.2 |

Polymerization conditions: 100 µL 1-hexene, 0.2994 mg catalyst, hexane diluent, 85° C. reactor temperature, 224 psig total pressure. Bu is butyl, Et is ethyl.

TABLE 2

Ethylene 1-Hexene Copolymerization with HA30W atalyst Activated at 538° C.

| Co-Catalyst Type/µmol | Activity g/g · hr | Mw (×10³) g/mole | Mw/Mn | 1-Hexene wt % |
|---|---|---|---|---|
| MgBu₂/1.0 | 870 | 491 | 22.4 | 2.3 |
| MgBu₂/2.8 | 673 | 682 | 39.7 | 1.8 |
| MgBu₂/4.6 | 832 | 643 | 33.4 | 2.6 |
| MgBu₂/6.4 | 426 | 422 | 24.8 | 2.1 |
| MgBu₂/8.2 | 444 | 604 | 33.3 | 2.5 |
| MgBu₂/10.0 | 555 | 605 | 29.1 | 2.4 |
| ZnEt₂/2.8 | 498 | 597 | 27.7 | 2.3 |
| ZnEt₂/4.6 | 425 | 519 | 25.4 | 2.4 |
| ZnEt₂/6.4 | 580 | 509 | 20.5 | 2.5 |
| ZnEt₂/8.2 | 369 | 456 | 24.2 | 2.3 |
| ZnEt₂/10.0 | 312 | 470 | 25.3 | 2.1 |
| BEt₃/1.0 | 519 | 426 | 24.7 | 2.8 |
| BEt₃/2.8 | 224 | 357 | 42.6 | 2.8 |
| BEt₃/4.6 | 165 | 356 | 16.4 | 3.2 |
| BEt₃/6.4 | 857 | 448 | 17.1 | 2.6 |
| BEt₃/8.2 | 347 | 397 | 15.7 | 3.0 |
| BEt₃/10.0 | 187 | 371 | 23.5 | 3.5 |
| AlEt₃/1.0 | 732 | 644 | 32.4 | 2.3 |
| AlEt₃/2.8 | 1264 | 848 | 41.3 | 2.0 |
| AlEt₃/4.6 | 1365 | 970 | 44.0 | 2.1 |
| AlEt₃/6.4 | 1293 | 844 | 42.9 | 2.5 |
| AlEt₃/8.2 | 1076 | 1043 | 46.8 | 2.3 |
| AlEt₃/10.0 | 1569 | 1036 | 42.4 | 2.4 |

Polymerization conditions: 100 µL 1-hexene, 0.2994 mg catalyst, hexane diluent, 85° C. reactor temperature, 224 psig total pressure, Bu is butyl, Et is ethyl.

TABLE 3

Ethylene 1-Hexene Copolymerization with 963 Catalyst Activated at 538° C.

| Co-Catalyst Type/µmol | Activity g/g · hr | Mw (×10³) g/mole | Mw/Mn | 1-Hexene wt % |
|---|---|---|---|---|
| MgBu₂/1.0 | 365 | 432 | 29.6 | 2.3 |
| MgBu₂/2.8 | 346 | 437 | 27.5 | 2.3 |
| MgBu₂/4.6 | 302 | 474 | 29.7 | 2.2 |
| MgBu₂/6.4 | 567 | 415 | 25.3 | 1.9 |

TABLE 3-continued

Ethylene 1-Hexene Copolymerization with 963 Catalyst Activated at 538° C.

| Co-Catalyst Type/µmol | Activity g/g · hr | Mw (×10³) g/mole | Mw/Mn | 1-Hexene wt % |
|---|---|---|---|---|
| MgBu$_2$/8.2 | 294 | 444 | 29.8 | 2.3 |
| MgBu$_2$/10.0 | 176 | 500 | 28.3 | 2.0 |
| ZnEt$_2$/1.0 | 463 | 403 | 25.3 | 2.1 |
| ZnEt$_2$/2.8 | 277 | 385 | 27.3 | 2.2 |
| ZnEt$_2$/4.6 | 251 | 362 | 23.9 | 2.3 |
| ZnEt$_2$/8.2 | 288 | 298 | 20.0 | 2.3 |
| ZnEt$_2$/10.0 | 264 | 307 | 26.2 | 2.4 |
| BEt$_3$/1.0 | 169 | 478 | 22.5 | 1.8 |
| BEt$_3$/2.8 | 43 | 404 | 22.0 | 2.5 |
| BEt$_3$/6.4 | 410 | 375 | 17.3 | 2.5 |
| BEt$_3$/8.2 | 529 | 326 | 19.3 | 3.1 |
| BEt$_3$/10.0 | 455 | 366 | 16.5 | 2.8 |
| AlEt$_3$/2.8 | 821 | 615 | 35.3 | 2.1 |
| AlEt$_3$/4.6 | 51 | 861 | 42.7 | 2.3 |
| AlEt$_3$/6.4 | 575 | 731 | 38.1 | 2.5 |
| AlEt$_3$/8.2 | 565 | 861 | 54.3 | 2.2 |
| AlEt$_3$/10.0 | 552 | 888 | 55.7 | 2.5 |

Polymerization conditions: 100 µL 1-hexene, 0.5004 mg catalyst, hexane diluent, 85° C. reactor temperature, 224 psig total pressure, Bu is butyl, Et is ethyl.

TABLE 4

Ethylene 1-Hexene Copolymerization with C25345 Catalyst Activated at 593° C.

| Co-Catalyst Type/µmol | Activity g/g · hr | Mw (×10³) g/mole | Mw/Mn | 1-Hexene wt % |
|---|---|---|---|---|
| MgBu$_2$/1.0 | 2041 | 206 | 17.3 | 2.4 |
| MgBu$_2$/2.8 | 1454 | 233 | 21.9 | 2.1 |
| MgBu$_2$/4.6 | 917 | 352 | 8.4 | 2.2 |
| MgBu$_2$/6.4 | 1776 | 637 | 21.6 | 2.3 |
| MgBu$_2$/8.2 | 958 | 202 | 15.9 | 2.2 |
| MgBu$_2$/10.0 | 993 | 214 | 17.5 | 2.1 |
| ZnEt$_2$/4.6 | 680 | 234 | 19.6 | 2.5 |
| ZnEt$_2$/6.4 | 632 | 237 | 16.3 | 2.4 |
| ZnEt$_2$/8.2 | 556 | 241 | 19.3 | 2.5 |
| ZnEt$_2$/10.0 | 462 | 256 | 18.2 | 2.1 |
| BEt$_3$/4.6 | 785 | 300 | 19.8 | 2.8 |
| BEt$_3$/8.2 | 799 | 274 | 22.0 | 2.9 |
| BEt$_3$/10.0 | 712 | 320 | 24.7 | 2.9 |
| AlEt$_3$/1.0 | 1297 | 276 | 21.4 | 2.6 |
| AlEt$_3$/2.8 | 1668 | 373 | 28.5 | 2.1 |
| AlEt$_3$/6.4 | 1601 | 496 | 35.3 | 2.3 |
| AlEt$_3$/8.2 | 1554 | 562 | 35.4 | 2.6 |
| AlEt$_3$/10.0 | 1626 | 584 | 54.7 | 2.5 |

Polymerization conditions: 100 µL 1-hexene, 0.5004 mg catalyst, hexane diluent, 85° C. reactor temperature, 224 psig total pressure, Bu is butyl, Et is ethyl.

TABLE 5

Ethylene 1-Hexene Copolymerization with C25345 Catalyst Activated at 538° C.

| Co-Catalyst Type/µmol | Activity g/g · hr | Mw (×10³) g/mole | Mw/Mn | 1-Hexene wt % |
|---|---|---|---|---|
| MgBu$_2$/1.0 | 1256 | 284 | 22.7 | 2.7 |
| MgBu$_2$/2.8 | 786 | 289 | 28.5 | 2.5 |
| MgBu$_2$/4.6 | 799 | 312 | 23.6 | 2.4 |
| MgBu$_2$/6.4 | 901 | 266 | 21.6 | 2.3 |
| MgBu$_2$/8.2 | 655 | 287 | 22.3 | 2.3 |
| MgBu$_2$/10.0 | 715 | 312 | 24.8 | 2.5 |
| ZnEt$_2$/1.0 | 761 | 275 | 30.2 | 2.5 |
| ZnEt$_2$/2.8 | 685 | 295 | 22.9 | 2.6 |
| ZnEt$_2$/4.6 | 620 | 284 | 23.3 | 2.5 |
| ZnEt$_2$/6.4 | 559 | 289 | 22.6 | 2.5 |
| ZnEt$_2$/8.2 | 461 | 249 | 18.7 | 2.4 |
| ZnEt$_2$/10.0 | 473 | 281 | 25.4 | 2.5 |
| BEt$_3$/1.0 | 1561 | 296 | 22.7 | 2.5 |
| BEt$_3$/2.8 | 754 | 384 | 25.4 | 2.4 |
| BEt$_3$/4.6 | 795 | 263 | 18.5 | 2.9 |
| BEt$_3$/6.4 | 666 | 296 | 20.2 | 2.8 |
| BEt$_3$/8.2 | 676 | 302 | 19.5 | 2.6 |
| BEt$_3$/10.0 | 324 | 319 | 18.8 | 2.4 |
| AlEt$_3$/4.6 | 1299 | 516 | 42.3 | 2.1 |
| AlEt$_3$/6.4 | 1141 | 600 | 35.2 | 2.2 |
| AlEt$_3$/8.2 | 669 | 650 | 46.6 | 1.9 |
| AlEt$_3$/10.0 | 127 | 824 | 53.1 | 1.8 |

Polymerization conditions: 100 µL 1-hexene, 0.5004 mg catalyst, hexane diluent, 85° C. reactor temperature, 224 psig total pressure, Bu is butyl, Et is ethyl.

All patents, test procedures, and other documents cited herein, including priority documents, are fully incorporated by reference to the extent such disclosure is not inconsistent with this invention and for all jurisdictions in which such incorporation is permitted.

The invention claimed is:

1. A process of polymerizing ethylene in a reactor comprising contacting a catalyst system comprising a supported chromium catalyst and an aluminum alkyl cocatalyst represented by the formula AlR$_3$, where each R is independently a C$_1$ to C$_{20}$ alkyl group, where the catalyst and cocatalyst are contacted by cofeeding the catalyst and cocatalyst to the reactor or feeding the catalyst and cocatalyst separately to the reactor, where the catalyst and cocatalyst are not contacted prior to the step of feeding or cofeeding, with ethylene, and from 0 to 50 mole % of one or more comonomers, where the polymerization occurs at a temperature between 85° C. and 120° C., and the molar ratio of aluminum from the cocatalyst to the chromium in the supported chromium catalyst is 60:1 or more; and recovering a polymer having a Mw/Mn of 25 or more.

2. The process of claim 1 further comprising recovering a polymer having an Mw/Mn of 40 or more.

3. The process of claim 1 further comprising recovering a polymer having a bimodal molecular weight distribution.

4. The process of claim 1 further comprising recovering a polymer having a bimodal molecular weight distribution and an Mw/Mn of 30 or more.

5. The process of claim 1, wherein the supported chromium catalyst comprises chromium supported on a silica-titania support.

6. The process of claim 1, wherein the supported chromium catalyst comprises titanium surface-modified supported chromium catalyst.

7. The process of claim 1, wherein the aluminum alkyl cocatalyst is represented by the formula AlR$_3$, where each R is independently a linear or branched C$_2$ to C$_8$ alkyl group.

8. The process of claim 1, wherein the cocatalyst comprises triethylaluminum, tri-isobutylaluminum or tri-n-octylaluminum.

9. The process of claim 1, wherein the polymerization reactor is a slurry reactor.

10. The process of claim 1, wherein the supported chromium catalyst is activated by heating to a temperature of from 400° C. to 900° C.

11. The process of claim 1, wherein the supported chromium catalyst is activated by heating to a temperature greater than 600° C.

12. The process of claim 1, wherein comonomer is present at 0.5 to 20 mole %.

13. The process of claim 1, wherein comonomer is present at 0.5 to 20 mole % and the comonomer(s) are, independently, selected from the group consisting of propylene, butene, pentene, hexene, septene, octene, nonene, decene, undecene, and dodecene.

14. The process of claim 1, wherein comonomer is present at 0.5 to 10 mole % and the comonomer(s) are, independently, selected from the group consisting of propylene, butene, pentene, hexene, octene, and decene.

15. The process of claim 1, wherein comonomer is present at 0 mole %.

16. The process of claim 1, wherein the polymerization is carried out at a temperature of from 85 to 100° C.

17. The process of claim 1, wherein the molar ratio of aluminum from the cocatalyst to the chromium in the supported chromium catalyst is 70:1 or more.

18. The process of claim 1, wherein the molar ratio of aluminum from the cocatalyst to the chromium in the supported chromium catalyst is 80:1 or more.

19. The process of claim 1, wherein the molar ratio of aluminum from the cocatalyst to the chromium in the supported chromium catalyst is 90:1 or more.

20. The process of claim 1, wherein the molar ratio of aluminum from the cocatalyst to the chromium in the supported chromium catalyst is 100:1 or more.

21. The process of claim 1, wherein the molar ratio of aluminum from the cocatalyst to the chromium in the supported chromium catalyst is 110:1 or more.

22. The process of claim 1, wherein the molar ratio of aluminum from the cocatalyst to the chromium in the supported chromium catalyst is 120:1 or more.

23. The process of claim 1, wherein the molar ratio of aluminum from the cocatalyst to the chromium in the supported chromium catalyst is 150:1 or more.

24. The process of claim 1, wherein the molar ratio of aluminum from the cocatalyst to the chromium in the supported chromium catalyst is 200:1 or more.

25. The process of claim 1, wherein the polymerization is carried out at a temperature of from 85 to 100° C., comonomer is present at 1 to 15 mole %, and the cocatalyst comprises triethylaluminum, triethylaluminum, tri-isobutylaluminum, tri-n-butylaluminum, or tri-n-octylaluminum.

26. The process of claim 25 wherein the molar ratio of aluminum from the cocatalyst to the chromium in the supported chromium catalyst is 70:1 or more.

27. The process of claim 26 wherein the comonomer(s) are, independently, selected from the group consisting of propylene, butene, pentene, hexene, septene, octene, nonene, decene, undecene, and dodecene.

28. The process of claim 27 wherein the comonomer is hexene.

29. The process of claim 1, wherein the polymerization is carried out at a temperature of from 85 to 100° C., comonomer is present at 1 to 15 mole %, the cocatalyst comprises triethylaluminum, the molar ratio of aluminum from the cocatalyst to the chromium in the supported chromium catalyst is 100:1 or more, and the comonomer(s) are, independently, selected from the group consisting of propylene, butene, pentene, hexene, septene, octene, nonene, decene, undecene, and dodecene.

30. The process of claim 29 wherein the comonomer is hexene.

31. A process of polymerizing ethylene in a reactor comprising contacting a catalyst system comprising a supported chromium catalyst and a triethyl aluminum cocatalyst, where the catalyst and cocatalyst are contacted by cofeeding the catalyst and cocatalyst to the reactor or feeding the catalyst and cocatalyst separately to the reactor, where the catalyst and cocatalyst are not contacted prior to the step of feeding or cofeeding, with ethylene and hexene, where the polymerization occurs at a temperature between 70 and 90° C., and the molar ratio of aluminum from the cocatalyst to the chromium in the supported chromium catalyst is 100:1 or more and recovering a polymer having a Mw/Mn of 25 or more.

32. A process of polymerizing ethylene in a reactor comprising: 1) contacting a catalyst system comprising a supported chromium catalyst and a triethyl aluminum cocatalyst, where the catalyst and cocatalyst are contacted by cofeeding the catalyst and cocatalyst to the reactor or feeding the catalyst and cocatalyst separately to the reactor, where the catalyst and cocatalyst are not contacted prior to the step of feeding or cofeeding, with ethylene and hexene, where the polymerization occurs at a temperature between 70 and 90° C., and the molar ratio of aluminum from the cocatalyst to the chromium in the supported chromium catalyst is 100:1 or more; and 2) obtaining a copolymer comprising ethylene and hexene having a bimodal or multimodal molecular weight distribution and an Mw/Mn of 30 or more.

* * * * *